United States Patent
Yoshida

(12) 
(10) Patent No.: US 6,493,557 B1
(45) Date of Patent: Dec. 10, 2002

(54) ON-BOARD COMMUNICATION SYSTEM HAVING MULTIPLE COMMUNICATION DEVICES

(75) Inventor: Ichiro Yoshida, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/450,709

(22) Filed: Nov. 30, 1999

(30) Foreign Application Priority Data

Dec. 1, 1998 (JP) ............................................. 10-342025

(51) Int. Cl.⁷ ................................................ H04Q 7/20
(52) U.S. Cl. ....................... 455/456; 455/426; 455/550; 340/438
(58) Field of Search ................................ 455/456, 461, 455/426, 414, 418, 419, 428, 423; 701/1, 2, 9, 23, 24, 200, 201, 208, 207, 213, 214; 340/434, 441

(56) References Cited

U.S. PATENT DOCUMENTS

| | | | |
|---|---|---|---|
| 5,659,878 A | | 8/1997 | Uchida et al. |
| 5,831,545 A | * | 11/1998 | Murray et al. ......... 340/825.49 |
| 5,987,377 A | * | 11/1999 | Westerlage et al. ......... 701/204 |
| 6,021,870 A | * | 2/2000 | Kim ............................. 187/247 |
| 6,032,051 A | * | 2/2000 | Hall et al. ................... 455/418 |
| 6,125,176 A | * | 9/2000 | Foladare et al. ....... 379/211.02 |
| 6,301,533 B1 | * | 10/2001 | Markow ....................... 701/35 |

FOREIGN PATENT DOCUMENTS

| | | |
|---|---|---|
| JP | 62-101135 | 5/1987 |
| JP | 3-132294 | 6/1991 |
| JP | 7-212817 | 8/1995 |
| JP | 8-154273 | 6/1996 |
| JP | 8-228384 | 9/1996 |
| JP | 9-116989 | 5/1997 |
| JP | 9-149455 | 6/1997 |
| JP | 9-284420 | 10/1997 |
| JP | 10-190845 | 7/1998 |
| JP | 10-243438 | 9/1998 |

OTHER PUBLICATIONS

Search/Examination Report in corresponding Japanese Application No. 10–342025.

* cited by examiner

Primary Examiner—William Trost
Assistant Examiner—Congvan Tran
(74) Attorney, Agent, or Firm—Harness, Dickey & Pierce, PLC

(57) ABSTRACT

A communication system having multiple devices each corresponding to a respective communication system is mounted on a moving vehicle. One or more devices that are usable at a present vehicle position and that are available at a communication receiving end are automatically identified by a controller in the on-board communication system. One or more devices to be actually used are selected from among those devices that are usable as well as available. A user may set communication conditions including those placing priority on a communication time or charges. A communication device to be actually used, or an order of use of plural devices may be determined according to the set conditions.

38 Claims, 9 Drawing Sheets

FIG. 9

| | DSRC | CELLULAR PHONE | STATIONARY SATELLITE | MIDDLE RANGE | LOW ORBIT SATELLITE |
|---|---|---|---|---|---|
| COMMUNICATION SPEED | 1Mbps | 10Kbps | 4Kbps | 1Mbps | 1Mbps |
| COMMUNICATION TIME (UP TO — SEC) | ¥5 | ¥20 | ¥40 | ¥4 | ¥40 |
| COMMUNICATION TIME (UP TO — SEC) | ¥10 | ¥40 | ¥40 | ¥10 | ¥60 |
| COMMUNICATION TIME (UP TO — SEC) | ¥15 | ¥80 | ¥50 | ¥20 | ¥80 |

FIG. 11

| | 1 | 2 | 3 | 4 |
|---|---|---|---|---|
| DEVICE | LOW ORBIT SATELLITE | CELLULAR PHONE | DSRC | STATIONARY SATELLITE |
| TIME | 10 SEC | 30 SEC | 30 SEC | 60 SEC |
| CHARGES | ×× | ○○ | △△ | □□ |

SELECT ONE FROM 1—4

ON-BOARD COMMUNICATION SYSTEM HAVING MULTIPLE COMMUNICATION DEVICES

CROSS-REFERENCE TO RELATED APPLICATION

This application is based upon and claims benefit of priority of Japanese Patent Application No. Hei-10-342025 filed on Dec. 1, 1998, the content of which is incorporated herein by reference.

BACKGROUND OF THE INVENTION

1. Field of the Invention

The present invention relates to a communication system mounted on a vehicle, the system having multiple communication devices which are selectively used.

2. Description of Related Art

Various communication devices in an Intelligent Transport System (ITS) field, such as devices corresponding to a Vehicle Information and Communication System (VICS) and an Electronic Toll Collection (ETC), are going to be mounted on an automotive vehicle in addition to a conventional automotive cellular phone. A communication system using satellites for efficiently managing an operation schedule of commercial vehicles is already in the market. In such a system, communication via satellites is utilized in addition to surface communication by a conventional telephone. Also, a Dedicated Short Range Communication (DSRC) system that is to be used in communication between a vehicle and roadside devices is now being developed. Under these circumstances, various communication devices corresponding to respective systems will be used in a vehicle in the near future.

When multiple communication devices are mounted on a vehicle, it is very important to select an appropriate device for actual use, because a position of the vehicle always changes and all the devices are not necessarily usable at a given vehicle position. Therefore, it is highly desirable to provide a system to help a user to select the appropriate communication device at a given situation. Moreover, such selection has to be done in consideration of various factors, such as urgency of communication, amount of data to be transmitted and charges for the communication.

SUMMARY OF THE INVENTION

The present invention has been made to solve the potential problems mentioned above, and an object of the present invention is to provide a system which helps a user to select appropriate communication devices from among multiple devices mounted on a vehicle in accordance with varying vehicle positions. Another object of the present invention is to provide a system in which communication is performed under desired conditions including communication time and charges. Yet another object of the present invention is, when plural devices are selected, to determine an order of use of the selected devices.

A communication system that includes multiple communication devices is mounted on a vehicle. The communication devices respectively correspond to various communication systems, such as a DSRC, a middle range, a stationary satellite, a cellular phone and a low orbit satellite communication system. The on-board communication system also includes a controller to select one or plural communication devices which are most appropriate in a given situation from among the multiple communication devices.

Ever-changing vehicle positions are detected by a vehicle position detector, and information showing a present vehicle position is fed to the controller. The controller selects one or more communication devices that are usable at the detected present vehicle position, considering field intensity at that position. The controller also specifies one or more communication devices that are available at a communication receiving end. Both the usable devices and the available devices are memorized in memories. One or more communication devices to be actually used are selected from among the devices that are usable at the present vehicle position as well as available at the receiving end.

Preferably, the on-board system further includes a device for setting communication conditions according to user's preference. Conditions, such as a condition under which a communication time has priority and a condition under which communication charges have priority, may be set by a user. When there are plural pieces of data to be transmitted, those data may be classified into a few classes according to their urgency, so that the urgent data are transmitted first. When there are plural devices that are selected to be used, a user may select one device from those for actual use, or may set an order of use. Alternatively, the order of use may be determined by the controller based on the conditions set by the user.

According to the present invention, a communication device that can be appropriately used at the present vehicle position is efficiently selected from among multiple communication devices mounted on a vehicle. Also, the communication between a vehicle and arbitrary locations including other vehicles can be efficiently performed, taking into consideration urgency and user's preferred conditions.

Other objects and features of the present invention will become more readily apparent from a better understanding of the preferred embodiment described below with reference to the following drawings.

BRIEF DESCRIPTION OF THE DRAWINGS

FIG. 9 is a table showing an example of communication charges required in various communication systems.

FIG. 11 is an example of a display showing various communication systems to be selected by a user, together with respective communication time and charges.

DETAILED DESCRIPTION OF THE PREFERRED EMBODIMENT

A preferred embodiment of the present invention will be described with reference to the accompanying drawings.

Figure 1:
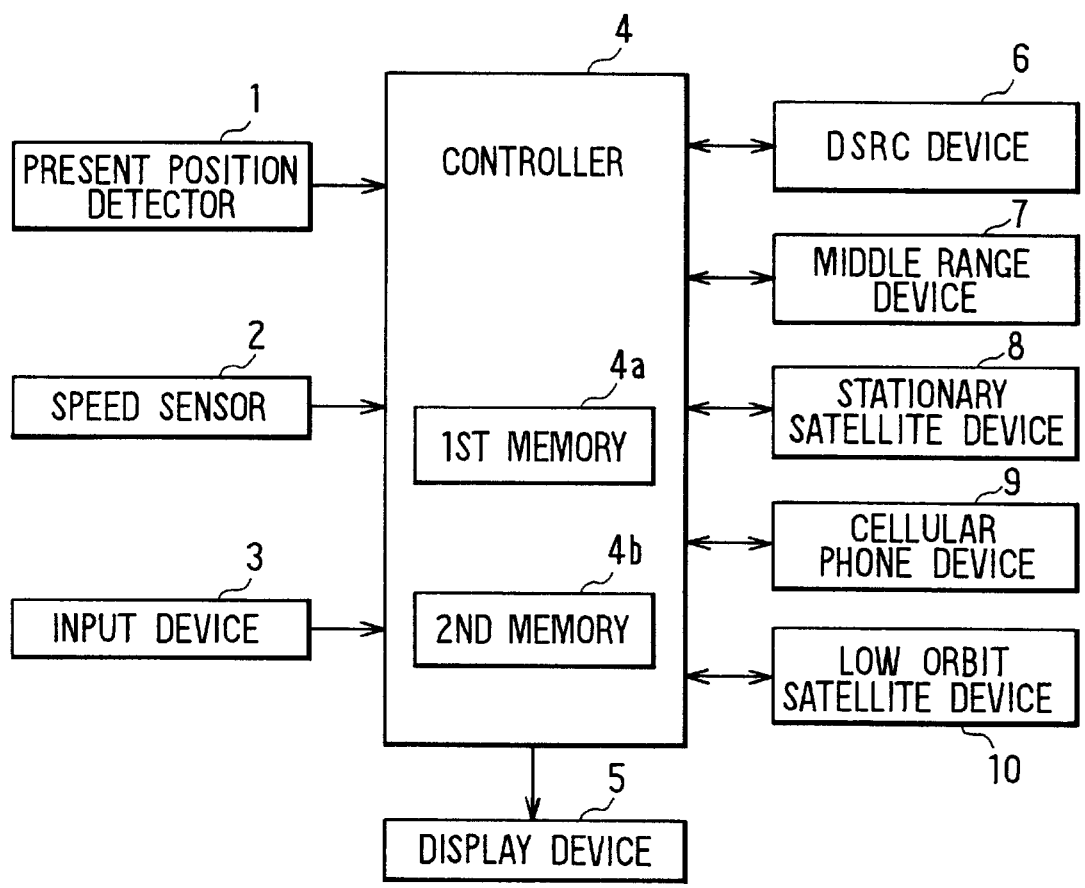
FIG. 1 is a block diagram showing a whole communication system according to the present invention.

First, referring to FIG. 1, a whole structure of the communication system will be described. The system is composed of: a present position detector 1; a speed sensor 2; an input device 3; a controller 4; a display device 5; a device 6 corresponding to a DSRC communication system; a device 7 corresponding to a middle range communication system; a device 8 corresponding to a stationary satellite communication system; a device 9 corresponding to a cellular phone communication system; and a device 10 corresponding to a low orbit satellite communication system. All of these components and devices are connected as shown in FIG. 1 and mounted on a vehicle as an on-board system.

The present position detector 1 detects a position where a vehicle is located at present based on information fed from a detector such as a Global Positioning System (GPS). Upon receipt of a command from the controller 4, the present position detector 1 detects the present position and feeds that information to the controller 4. The speed sensor 2 feeds pulses representing a driving speed of the vehicle to the controller 4. The controller 4 calculates the vehicle speed based on the pulses fed from the speed sensor 2. The input device 3 includes a key board from which a user inputs various signals, and it supplies such signals to the controller 4. The controller 4 composed of a microcomputer and other components presides a communication process according to the signals fed from the input device 3.

The controller 4 includes a first memory 4a which stores information regarding usable communication systems at various vehicle positions and a second memory 4b which stores information regarding available communication systems at a receiving end. The controller 4 selects communication devices to be used for data transmission from among the communication devices 6–10, based on the information stored in the first and second memories 4a, 4b. That is, a communication device corresponding to a usable system at a present vehicle position and also corresponding to an available system at a receiving end is decided as a device to be used in communication. Details of the communication process will be described later. The display device 5 composed of a CRT, a liquid crystal display or the like displays information concerning the communication process to a user.

Figure 2:
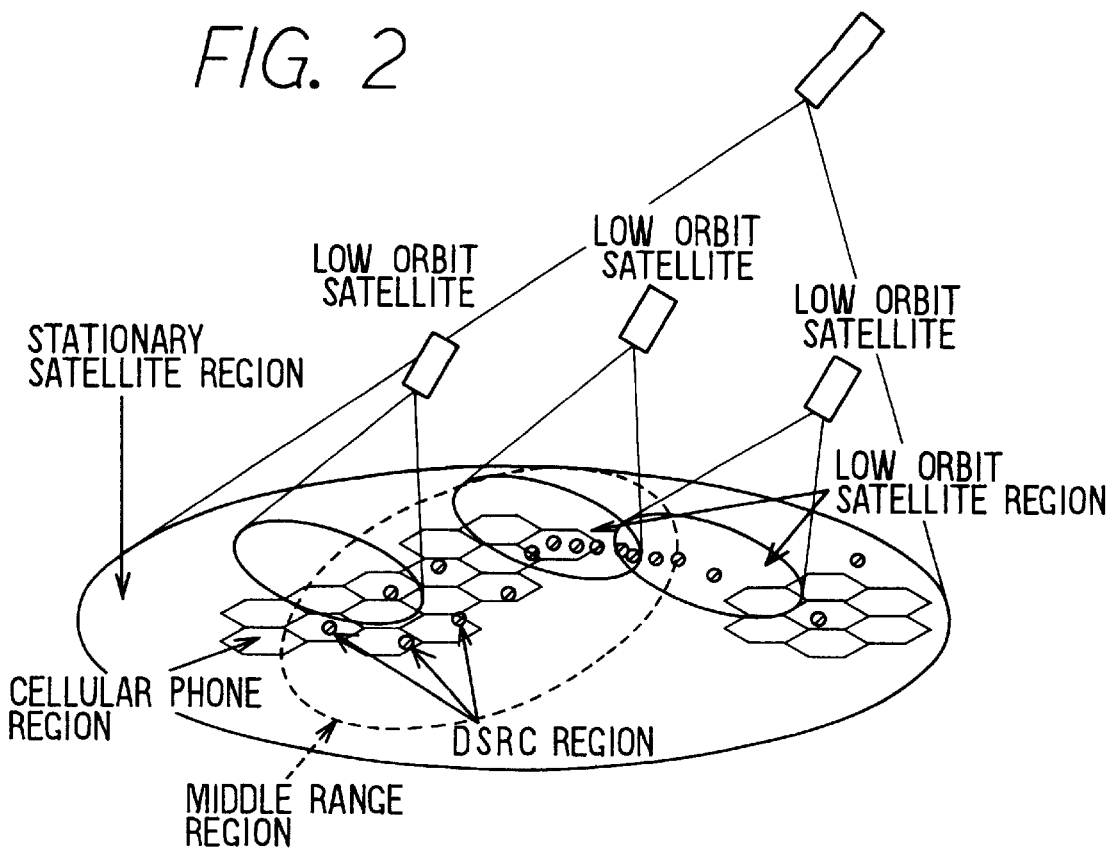
FIG. 2 is a drawing showing communication regions respectively corresponding to various communication systems.

The communication devices 6–10 respectively corresponding to the DSRC, middle range, stationary satellite, cellular phone and low orbit communication systems mounted on a vehicle are selectively used in the communication with other vehicles or base terminals having the corresponding communication devices. As shown in FIG. 2, a region in which a respective communication system is able to perform communication (a communicable region) is different from one another. The DSRC system has the narrowest region, and the stationary satellite system has the widest region. The communicable regions of respective systems are enlarged in the following order: the DSRC, the cellular phone, the middle range, the low orbit satellite and the stationary satellite. Wherever a vehicle is located, it is always covered by the stationary satellite system.

Figure 3:
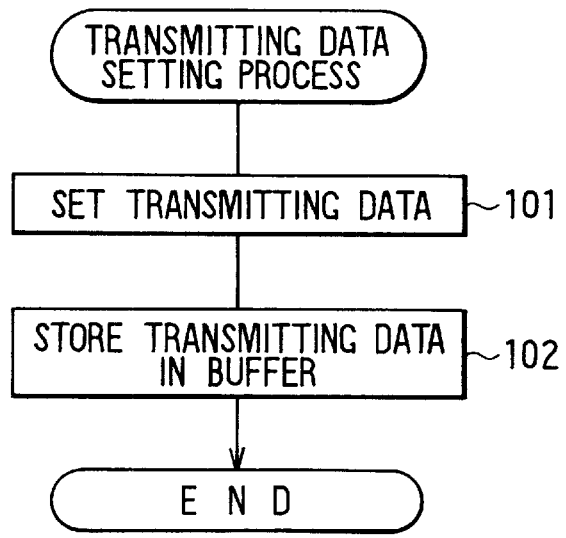
FIG. 3 is a flowchart showing a process for setting transmitting data.

Referring to FIG. 3, a process for setting data to be transmitted will be described. A user makes data setting via the input device 3. At step 101, the data to be transmitted are set. The data includes information regarding a receiving end and transmission priority in addition to the data contents. A coded ID identifying the receiving end may be used as the information regarding the receiving end. The transmission priority may be ranked into several classes. For example, the data to be urgently transmitted is ranked as priority 1, the data including some important messages as priority 2, the data for just information as priority 3, and so forth. At step 102, the transmitting data are stored in a buffer in the controller 4.

Figure 4:
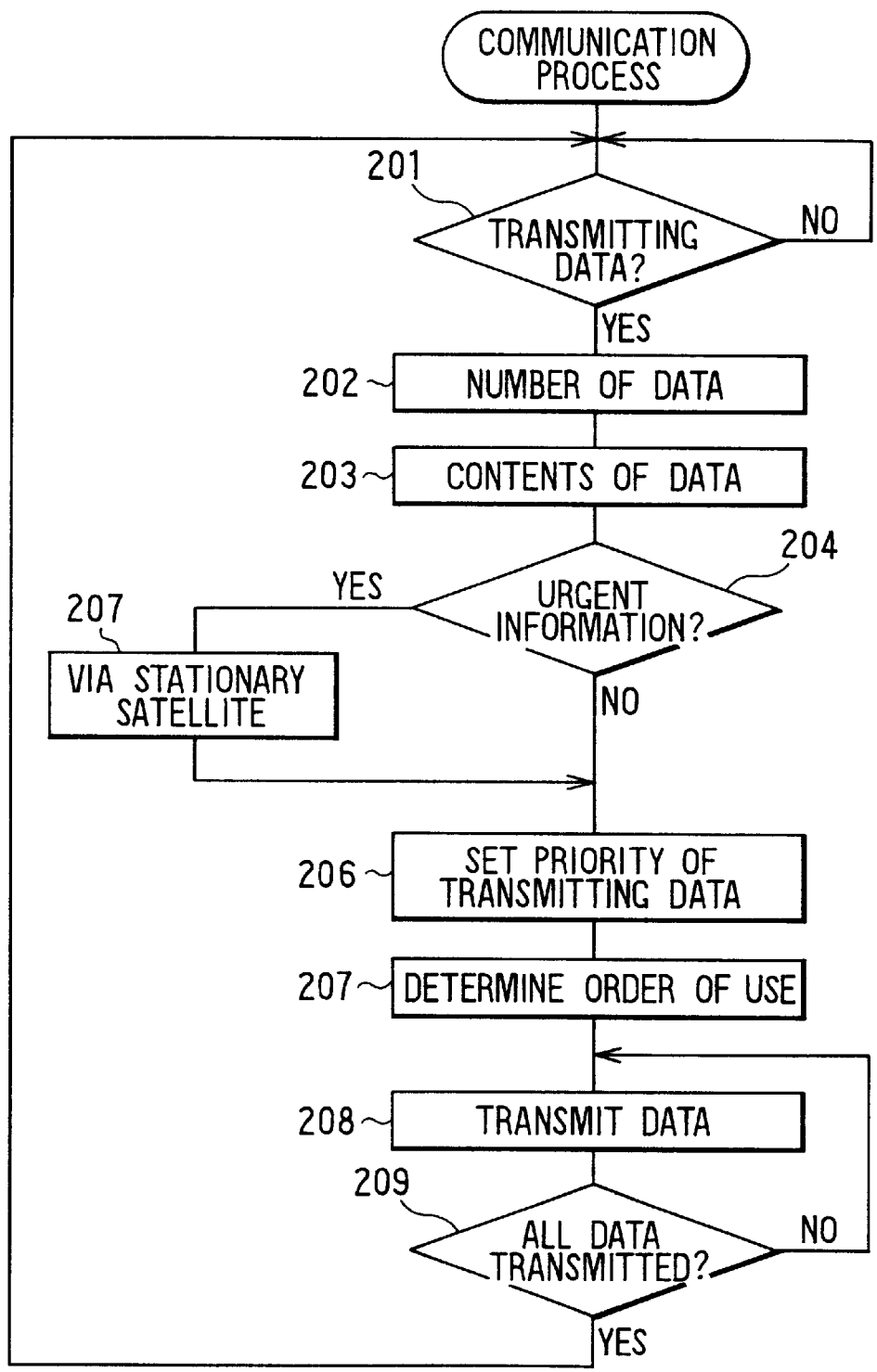
FIG. 4 is a flowchart showing a communication process performed according to the present invention.

Referring to the flowchart shown in FIG. 4, the communication process will be described. At step 201, whether the transmitting data are stored in the buffer is checked. This may be checked with predetermined intervals, e.g., every 15 seconds. If the transmitting data are stored, at step 202 the number of the data stored is counted. At step 203, the contents of the transmitting data are confirmed. At step 204, whether data to be urgently transmitted are included or not is determined. If the urgent data are included, at step 205 the urgent data are transmitted via the stationary satellite communication system. Other data that have not to be urgently transmitted are arranged according to their priority order at step 206. At step 207, the order of use of the communication devices is determined according to the priority. The details of step 207 will be described later with reference to FIG. 5. Then, at step 208 the data are transmitted in the priority order, using the communication devices according to the order of use determined at step 207. For example, when the order of use has been determined in the order of the low orbit satellite device 10, the cellular phone device 9, the DSRC device 6, the middle range device 7 and the stationary satellite device 8, a given data is first transmitted via the low orbit satellite device 10. If the communication via the low orbit satellite device 10 cannot be performed, then the data transmission is tried according to the order of use. If the transmission cannot be performed via any one of the communication devices, then a message indicating transmission malfunction is displayed on the display device 5. At step 209, whether all the data transmission is successfully completed or not is determined. If it is successfully completed, the process returns to step 201 and the process is repeated. If not, the process returns to step 208.

Referring to the flowchart shown in FIG. 5, step 207 in which the order of use of the communication devices is determined will be described in detail. The flowchart of FIG. 5 only shows the process for one given transmitting data. When there are plural data to be transmitted, the same process is performed for each data. At step 301, information indicating a present position of the vehicle is received from the present position detector 1. At step 302, a presently usable communication device is selected based on the information stored in the first memory 4a and the present vehicle position. The communicable regions of respective communication devices 6–10 stored in the first memory 4a are schematically shown in FIG. 6. Since the communicable regions are stored in a form corresponding to various vehicle positions, a communication device that has a region in which the present vehicle position is included is selected as a communication device to be used. For example, if the present vehicle position is included in one of the communicable regions of the DSRC system, then the DSRC device 6 is selected as the device to be used. It is also possible to select the communication device that has a communicable region in which not only the present vehicle position but also a predetermined area around the present vehicle position is included, in order to cover a certain area of the moving vehicle. In this case, the predetermined area may be varied according to the present vehicle speed, so that the area becomes proportional to the vehicle speed.

At step 303 (FIG. 5), a communication device which is available at the receiving end is selected based on the information stored in the second memory 4b and the ID of the receiving end. At step 304, whether or not there is a record to show that communication with the particular receiving end is previously performed from the present vehicle position using the selected device is checked. If there is such a previous record, the order of use of the communication device is determined based on the record. If there is no such a previous record, it is determined at step 306 if the stationary satellite device is only one device which is presently usable at the transmitting end and is available at the receiving end. If the stationary satellite device is the only one device, it is determined at step 307 to use that device. If not, i.e., other devices are also usable and available, the process proceeds to step 308 where communication time, charges and weighted charges for the respective communication devices are calculated.

Figure 7:
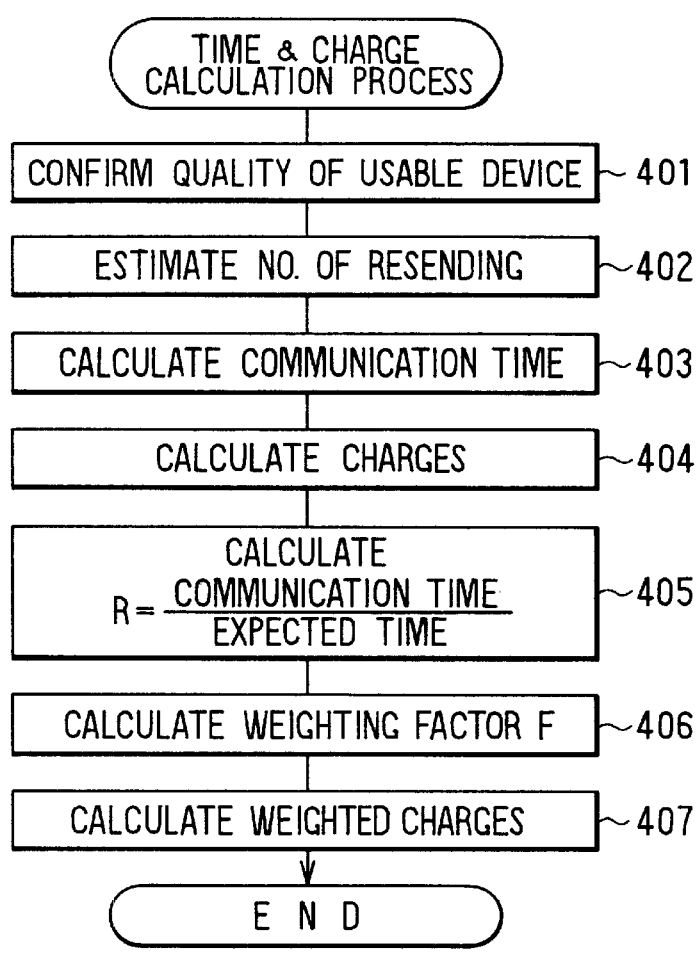
FIG. 7 is a flowchart showing a process for calculating a communication time and charges.
Figure 8:
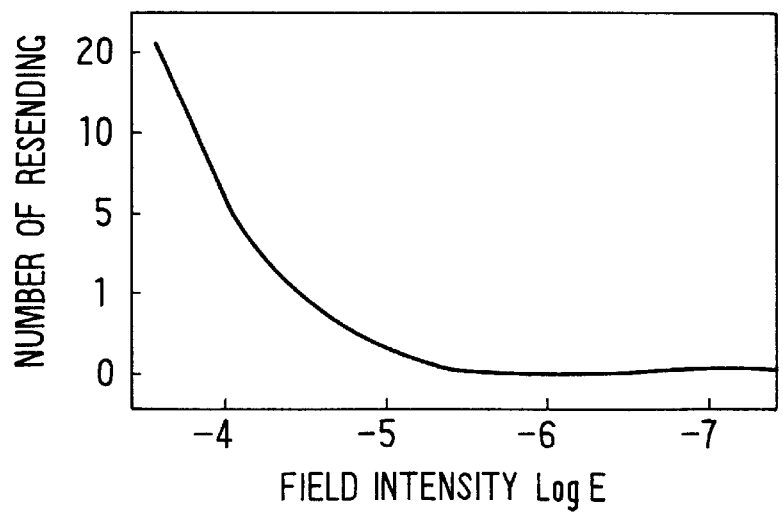
FIG. 8 is a graph showing a relation between field intensity and the number of resending.

The time and charge calculation process performed in step 308 will be described in detail with reference to the flowchart shown in FIG. 7. Though the flowchart of FIG. 7 only shows the process for one communication device, the same process is similarly applied to other devices. At step 401, communication quality of a given device is confirmed by measuring field intensity of that device or by calculating the field intensity based on a stored map showing relation between the present vehicle position and the field intensity. At step 402, the number of resending is estimated from the field intensity. The relation between the field intensity and the number of resending is memorized in a map in a form as shown in FIG. 8. At step 403, a time (a period of time) required for the communication is calculated. For example, the communication time is calculated according to the following formula: the communication time=(Tx×(1+Nr)+Ty), where Tx is a time determined from communication speed of a communication device and the amount of transmitting data, Ty is a time required to make and confirm connection between the transmitting end and the receiving end, and Nr is the number of resending. The communication speed and charges of respective communication devices are memorized in the controller 4 as shown in FIG. 9. At step 404, communication charges are calculated from the memorized table shown in FIG. 9.

Figure 10:
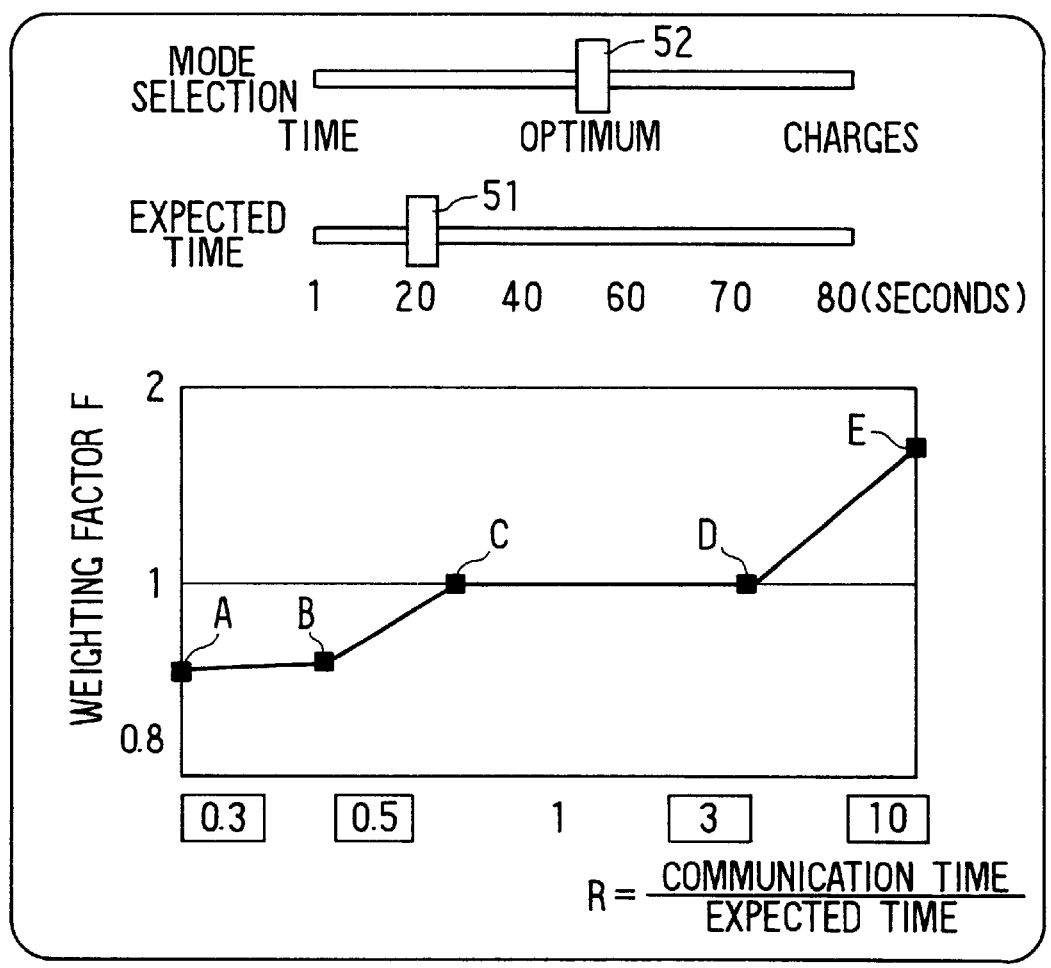
FIG. 10 is an example of a display for setting communication conditions.

At steps 405–407 (FIG. 7), weighted charges are calculated. The weighted charges are charges weighted by a ratio R of the communication time calculated at step 403 to a communication time expected by a user. The user sets conditions of communication, using the display device 5 as shown in FIG. 10. The graph in the display shows relation between a ratio R of the communication time to the expected time and the weighting factor F. The weighting factor F is determined based on the ratio R. The weighted charges are calculated according to the following formula: (the weighted charges)=(the communication charges)×(the weighting factor F). When the ratio R is smaller than 1 and the weighting factor F is calculated as smaller than 1 as shown in the graph, the weighted charges become lower than the communication charges. On the other hand, when the ratio R is larger than 1 and the weighting factor F is calculated as larger than 1, the weighted charges become higher than the communication charges.

The points A–E shown in the graph (FIG. 10) can be set by a user, and the numbers showing the ratio R on the abscissa can be also set by the user according to his/her preference. Accordingly, the weighting factor F is determined by the user. The expected time is also set by the user by moving a slider 51 shown in the display. The display shown in FIG. 10 also includes a mode selection slider 52. The user may select one mode from among three modes, i.e., a first mode in which priority is placed on the communication time, a second mode in which priority is placed on an optimum combination of the communication time and charges and a third mode in which priority is placed on the charges. The display shown in FIG. 10 is used as a device for setting communication conditions, based on which the controller 4 performs the communication process.

At step 405 (FIG. 7), the controller 4 calculates the ratio R according to conditions set by a user. At step 406, the weighting factor F is calculated based on the ratio R. Then, the weighted charges are calculated, at step 407, by multiplying the charges with the weighting factor F. The process shown in FIG. 7 is performed for each usable communication device, and accordingly the communication time, the charges and the weighted charges are calculated for each communication device.

Figure 5:
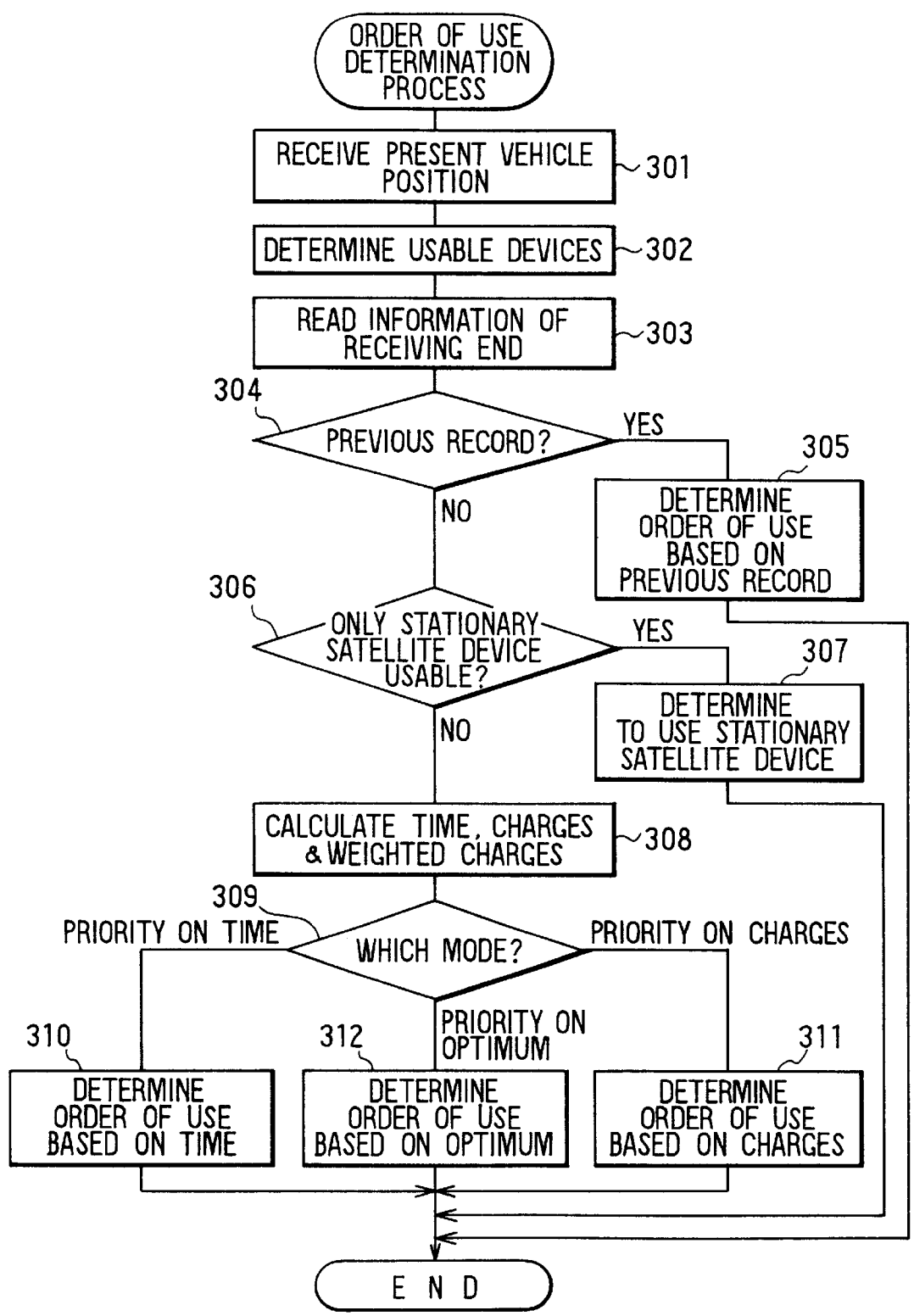
FIG. 5 is a flowchart showing a process for determining an order of use of various communication devices.
Figure 6:
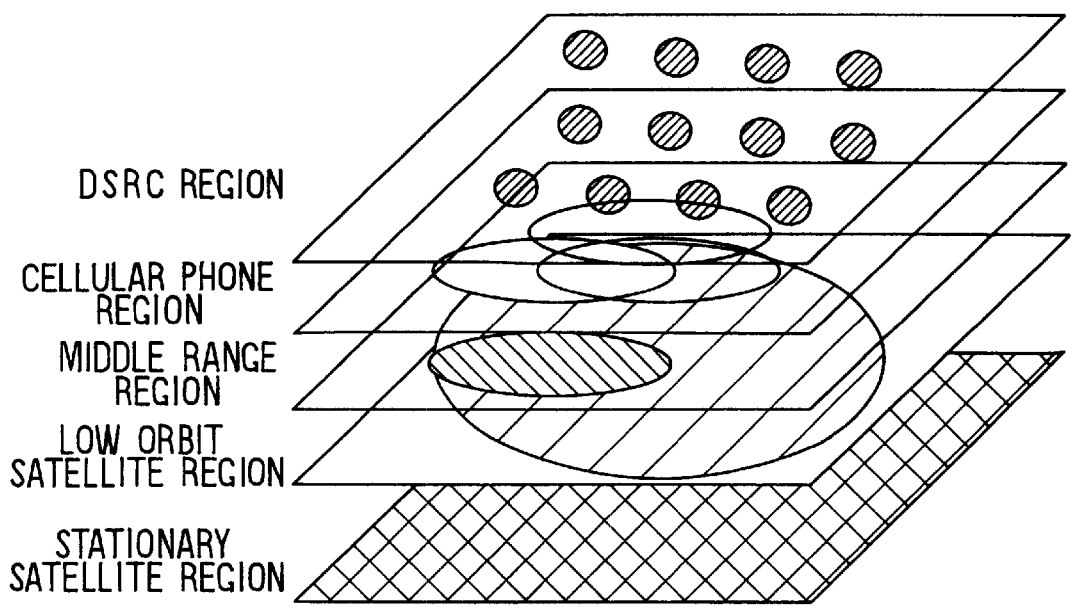
FIG. 6 is a schematic drawing showing a data structure stored in a first memory.

After completion of the process of step 308, the controller 4 performs steps 309–312 shown in FIG. 5. At step 309, which mode is selected from among three modes by the user is checked. If the time priority mode (the first mode) is selected, the process moves to step 310 where the order of use of the communication devices is determined based on the communication time. That is, the communication time required by the respective usable devices is compared, and the order of use is determined according to the length of the communication time (a device having the shortest time is used first). If the charge priority mode (the third mode) is selected, the order of use is determined, at step 311, according to the amount of charges (a device requiring the lowest charges is used first). If the optimum mode (the second mode) is selected, the order of use is determined, at step 312, according to the weighted chargers (a device requiring the lowest weighted charges is used first). After the order of use of the communication devices is determined in the manner described above, the data transmission is performed at step 208 (FIG. 4), using the communication devices in the order of use. The determined order of use is memorized in the controller 4 as a previous record together with the data regarding the receiving end.

The advantages of the communication system of the present invention will be summarized as follows. Since usable on-board communication devices are selected based on the vehicle position, communication can be always performed via the selected devices, irrespective of the vehicle position. Since available communication devices at a receiving end are also selected at the same time, communication between the vehicle and the receiving end can be performed without fail. Since a user selects a communication mode from among the time priority mode, the charge priority mode and the optimum mode, the communication can be performed according to his/her preference. Since the data transmission priority is set, an urgent information can be first sent.

The process of determining the order of use of the communication devices in step 207 (FIG. 4), the details of which are described with reference to FIG. 5, may be somewhat modified. After the communication time and charges are calculated, the user may determine a communication device to be used with reference to information displayed on the display device 5. For example, a display such as the one shown in FIG. 11 may be shown on the display device 5, and the user may select one of the communication devices from among the devices shown, or may set the order of use of the communication devices.

Though the present invention is described in connection with the on-board communication system that performs communication with arbitrary receiving ends, this invention is also applicable to a system that performs communication with specified base terminals, such as terminals for controlling operation of commercial vehicles.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An on-board communication system including multiple communication devices, the system comprising:

means for detecting a present position of a vehicle;

means for selecting communication devices that are usable at the detected present vehicle position from among the multiple communication devices; and means for setting conditions for determining a communication device to be used; wherein:

the selecting means determines a communication device by selecting a communication device from among the usable communication devices based on the conditions set by the condition setting means.

2. The on-board communication system as in claim 1, further including a first memory for storing information regarding the communication devices usable at the present vehicle position.

3. The on-board communication system as in claim 1, further including a second memory for storing information regarding communication devices that are available at a receiving end, wherein:

the selecting means determines a communication device that is usable at the present vehicle position and is also available at the receiving end as a communication device to be actually used.

4. The on-board communication system as in claim 1, wherein:

the condition setting means sets the communication conditions according to data input by a user.

5. The on-board communication system as in claim 4, wherein:

the communication conditions include a condition under which priority is placed on communication charges.

6. The on-board communication system as in claim 4, wherein:

the communication conditions include a condition under which priority is placed on communication time.

7. An on-board communication system including multiple communication devices, the system comprising:

means for detecting a present position of a vehicle; and means for selecting communication devices that are usable at the detected present vehicle position from among the multiple communication devices; wherein: the selecting means further determines an order of use of the usable communication devices.

8. An on-board communication system including multiple communication devices adapted to communicate with multiple external receivers, the system comprising:

means for detecting a present position of a vehicle; and means for selecting communication devices that are usable at the detected present vehicle position from among the multiple communication devices; wherein: the selecting means further determines a communication device to be actually used based on user's preference that is fed by the user.

9. An on-board communication system including multiple communication devices adapted to communicate with multiple external receivers, the system comprising:

means for detecting a present position of a vehicle;

a first memory for memorizing communication devices that are usable at the detected present vehicle position;

a second memory for memorizing communication devices that are available at receiving ends; and means for selecting one or more communication devices from among the communication devices commonly memorized both in the first and the second memories and for determining such communication devices as devices to be actually used.

10. The communication system as in claim 9, further including means for setting communication conditions according to user's preference, wherein:

the selecting and determining means determines communication devices as devices to be actually used based on the conditions set by the setting means.

11. The communication system as in claim 9, wherein:

the communication devices memorized in the first memory include communication devices that are usable in a predetermined area around the detected present vehicle position.

12. The on-board communication system as in claim 11, wherein:

the predetermined area is enlarged according to increase of a driving speed of the vehicle.

13. The on-board communication system as in claim 10, wherein:

the selecting and determining means further determines order of use of the selected communication devices.

14. The on-board communication system as in claim 13, wherein:

the order of use is determined based on a record showing previous communication.

15. The on-board communication system as in claim 13, wherein:

the order of use is determined by referring to a communication time, communication charges and weighted charges of each of the selected communication devices.

16. The on-board communication system as in claim 9, wherein:

the communication devices that are usable at the detected present vehicle position are determined based on a field intensity that is available to respective communication devices, the field intensity being either measured or calculated based on a stored map showing a relation between vehicle positions and the field intensities.

17. The on-board communication system as in claim 10, wherein:

the communication conditions include a condition under which priority is placed on a communication time, a condition under which priority is placed on communication charges and a condition under which priority is placed on an optimum combination of the communication time and communication charges.

18. A method of selecting communication devices to be used from among multiple communication devices adapted to communicate with multiple external receivers and being mounted on a vehicle, the method comprising steps of:

detecting a present position of a vehicle;

choosing communication devices that are usable at the detected present position of the vehicle;

specifying communication devices that are available at a communication receiving end; and selecting one or more communication devices to be used from among the communication devices that are usable at the detected present position of the vehicle and are available at the receiving end.

19. The method of selecting communication devices as in claim 18, the method further comprising a step of determining an order of use of the selected communication devices.

20. An on-board communication system including multiple communication devices, the system comprising:
- means for detecting a present position of a vehicle;
- means for selecting usable communication devices based on the detected present vehicle position from among the multiple communication devices; and
- means for setting conditions for determining a communication device to be used; wherein:
  - the selecting means determines a communication device by selecting a communication device from among the usable communication devices based on the conditions set by the condition setting means.

21. The on-board communication system as claim 20, further including a first memory for storing information regarding the usable communication devices.

22. The on-board communication system as claim 20, further including a second memory for storing information regarding communication devices that are available at a receiving end, wherein:
- the selecting means determines a communication device based on the present vehicle position and is also available at the receiving end as a communication device to be actually used.

23. The on-board communication system as in claim 20, wherein:
- the condition setting means sets the communication conditions according to data input by a user.

24. The on-board communication system as in claim 23, wherein:
- the communication conditions include a condition under which priority is placed on communication charges.

25. The on-board communication system as in claim 23, wherein:
- the communication conditions include a condition under which priority is placed on communication time.

26. An on-board communication system including multiple communication devices, the system comprising:
- means for detecting a present position of a vehicle; and
- means for selecting usable communication devices based on the detected present vehicle position from among the multiple communication devices; wherein:
  - the selecting means further determines an order of use of the usable communication devices.

27. An on-board communication system including multiple communication devices adapted to communicate with multiple external receivers, the system comprising:
- means for detecting a present position of a vehicle; and
- means for selecting usable communication devices based on the detected present vehicle position from among the multiple communication devices; wherein:
  - the selecting means further determines a communication device to be actually used based on user's preference that is fed by the user.

28. An on-board communication system including multiple communication devices adapted to communicate with multiple external receivers, the system comprising:
- means for detecting a present position of a vehicle;
- a first memory for memorizing usable communication devices based on the detected present vehicle position;
- a second memory for memorizing communication devices that are available at receiving ends; and
- means for selecting one or more communication devices from among the communication devices commonly memorized both in the first and the second memories and for determining such communication devices as devices to be actually used.

29. The communication system as in claim 28, further including means for setting communication conditions according to user's preference, wherein:
- the selecting and determining means determines communication devices as devices to be actually used based on the conditions set by the setting means.

30. The communication system as in claim 28, wherein:
- the usable communication devices memorized in the first memory include communication devices that are usable in a predetermined area around the detected present vehicle position.

31. The on-board communication system as in claim 30, wherein:
- the predetermined area is enlarged according to increase of a driving speed of the vehicle.

32. The on-board communication system as in claim 30, wherein:
- the selecting and determining means further determines order of use of the selected communications devices.

33. The on-board communication system as in claim 32, wherein:
- the order of use is determined based on a record showing previous communication.

34. The on-board communication system as in claim 32, wherein:
- the order of use is determined by referring to a communication time, communication charges and weighted charges of each of the selected communication devices.

35. The on-board communication system as in claim 28, wherein:
- the usable communication devices to be memorized in the first memory are determined based on a field intensity that is available to respective communication devices, the field intensity being either measured or calculated based on a stored map showing a relation between vehicle positions and the field intensities.

36. The on-board communication system as in claim 29, wherein:
- the communication conditions include a condition under which priority is placed on a communication time, a condition under which priority is placed on communication charges and a condition under which priority is placed on an optimum combination of the communication time and communication charges.

37. A method of selecting communication devices to be used from among multiple communication devices adapted to communicate with multiple external receivers and being mounted on a vehicle, the method comprising steps of:
- detecting a present position of a vehicle;
- choosing usable communication devices based on the detected present position of the vehicle;
- specifying communication devices that are available at a communication receiving end; and
- selecting one or more communication devices to be used from among the usable communication devices chosen based on the detected present position of the vehicle and are available at the receiving end.

38. The method of selecting communication devices as in claim 37, the method further comprising a step of determining an order of use of the selected communication devices.

* * * * *